US010024946B2

(12) United States Patent
Robinson et al.

(10) Patent No.: US 10,024,946 B2
(45) Date of Patent: Jul. 17, 2018

(54) DETERMINATION OF A GROUND RECEIVER POSITION

(71) Applicant: Raytheon Company, Waltham, MA (US)

(72) Inventors: Ian S. Robinson, Redondo Beach, CA (US); Andrew M. Hautzik, Rancho Palos Verdes, CA (US); Brandon Crow, Gardena, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 15/610,597

(22) Filed: May 31, 2017

(65) Prior Publication Data

US 2017/0269185 A1   Sep. 21, 2017

Related U.S. Application Data

(62) Division of application No. 14/498,069, filed on Sep. 26, 2014, now Pat. No. 9,829,558.

(51) Int. Cl.
| | |
|---|---|
| *G01S 19/13* | (2010.01) |
| *G01S 19/09* | (2010.01) |
| *G01S 1/02* | (2010.01) |
| *G01S 19/10* | (2010.01) |
| *G01S 19/48* | (2010.01) |
| *G01S 19/21* | (2010.01) |
| *G01S 19/11* | (2010.01) |

(52) U.S. Cl.
CPC ............... *G01S 1/02* (2013.01); *G01S 19/10* (2013.01); *G01S 19/11* (2013.01); *G01S 19/21* (2013.01); *G01S 19/215* (2013.01); *G01S 19/48* (2013.01)

(58) Field of Classification Search
CPC .......... G01S 19/09; G01S 19/13; G01C 21/20
USPC ............ 342/357.25, 357.26, 357.46, 357.51; 701/468, 469
See application file for complete search history.

(56) References Cited

U.S. PATENT DOCUMENTS

| 6,229,479 B1 | 5/2001 | Kozlov et al. |
| 6,301,545 B1 | 10/2001 | Brodie |
| 6,317,077 B1 | 11/2001 | Soleimani et al. |
| 7,668,654 B2 | 2/2010 | Pemble et al. |
| 2011/0238307 A1 | 9/2011 | Psiaki et al. |
| 2013/0293414 A1 | 11/2013 | Robinson et al. |

OTHER PUBLICATIONS

BAE Systems, Navigation via Signals of Opportunity (NAVSOP), http://www.baesystems.com/en/product/navigation-via-signals-of-opportunity-navsop, to the best of applicant's knowledge article was available before the application filing date, 4 pages, United Kingdom.
Boeing, Boeing/Iridium Team Completes High Integrity GPS Program Milestones, http://boeing.mediaroom.com/2009-07-10-Boeing-Iridium-Team-Completes-High-Integrity-GPS-Program-Milestones, Jul. 10, 2009, 3 pages, United States.

*Primary Examiner* — Dao L Phan (57) ABSTRACT

Technology for determining a geographical location of a ground receiver is disclosed. A plurality of radio frequency (RF) signals from a plurality of RF signal carriers may be received at the ground receiver. The plurality of RF signal carriers may include satellites operated by a foreign entity or non-global positioning system (non-GPS) satellites. The ground receiver may measure a Doppler shift associated with each of the plurality of RF signals. The geographical location of the ground receiver may be determined in X, Y and Z coordinates based in part on the Doppler shift associated with each of the plurality of RF signals.

16 Claims, 8 Drawing Sheets

DETERMINATION OF A GROUND RECEIVER POSITION

RELATED APPLICATIONS

This is a divisional application, which claims priority to and the benefit of U.S. patent application Ser. No. 14/498,069, filed on Sep. 26, 2014, which is incorporated by reference herein in its entirety.

BACKGROUND navigation systems, such as GPS, enable a receiver to determine a location from ranging signals received from a plurality of satellites. The ranging signals can be broadcasted on frequencies, such as the L1 signal (1.57542 gigahertz [GHz]), L2 signal (1.2276 GHz), and/or L5 signal (1.17645 GHz). L1 can have a wavelength of about 19 centimeters (cm) and L2 can have a wavelength of about 24 cm. Position can be determined from code and/or carrier phase information. A code division multiple access (CDMA) code is transmitted by the GPS satellites to the receiver and correlated with replica codes to determine ranges to different satellites, which can be used to determine the position of a GPS receiver on or near the Earth. Generally, a GPS receiver receives signals from multiple GPS satellites (e.g., four GPS satellites) to find its position.

It is desirable for receivers to be able to locate itself when no GPS signals are available or only a single such signal may be received. A wide array of techniques have been proposed to provide such position information including the use of stellar observations, inertial measurement units, signals of opportunity such as TV and cell phone signals. Each of these techniques suffers an issue of positional accuracy or lack of availability at times. For military operations, it is desirable to operate in all weather conditions, including clouds (which may obscure stellar measurements), and without reliance on TV or cellular signals in the adversaries country.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Figure 1:
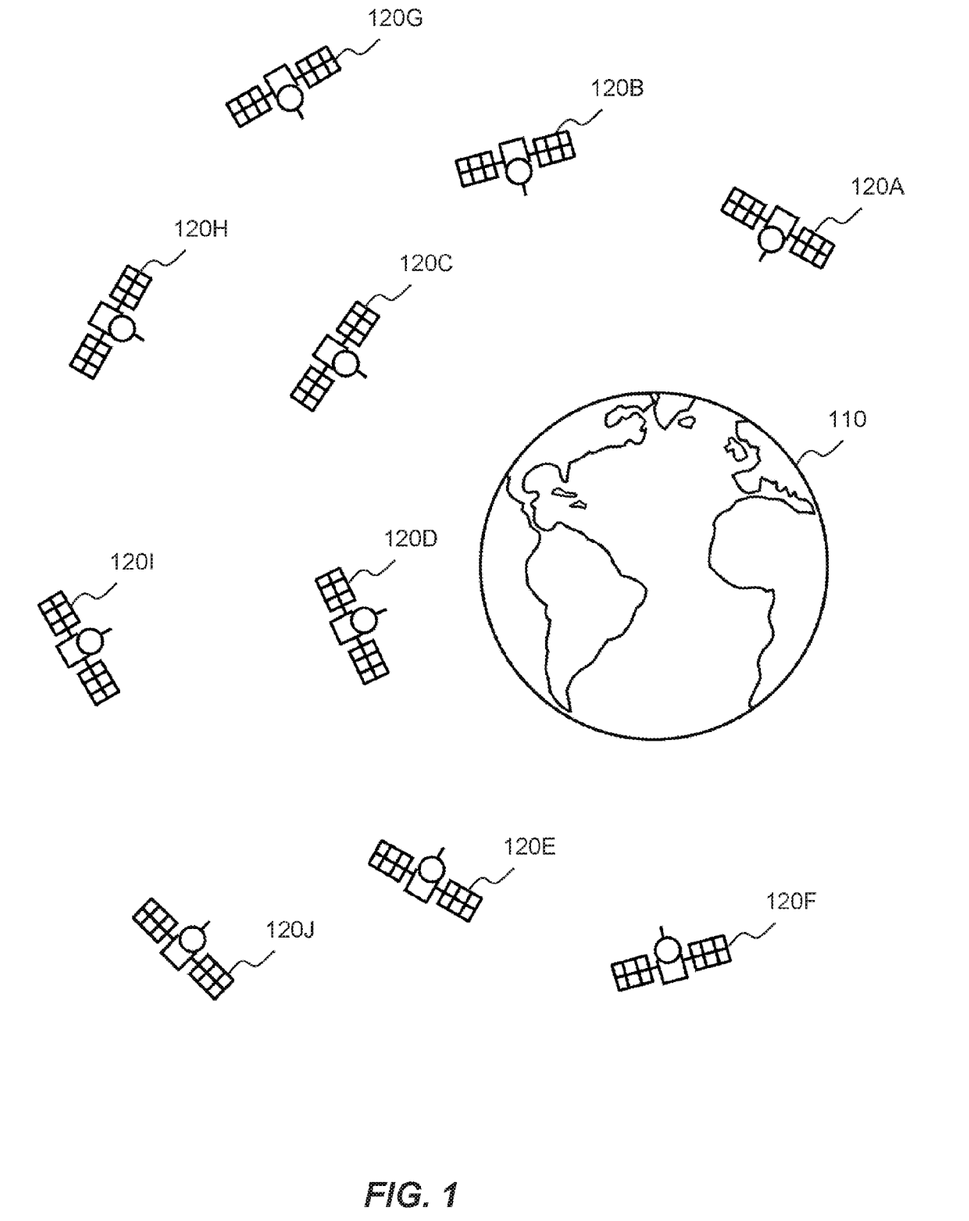
FIG. 1 illustrates a diagram of a plurality of navigation satellites, a plurality of low Earth orbit (LEO) satellites, and a plurality of geostationary Earth orbit (GEO) satellites or high Earth orbit (HEO) satellites in accordance with an example.

FIG. 1 illustrates a constellation of satellites 120A-J that orbit the Earth 110. The satellites 120A-J can include low Earth orbit (LEO) satellites, medium Earth orbit (MEO) satellites, high Earth orbit (HEO) satellites or geostationary Earth orbit (GEO) satellites. The satellites 120A-J can include cube satellites (CUBESATs), pico-satellites, nano-satellites, or micro-satellites, wherein the CUBESATs weigh less than 5 kilograms, or others as recognized by those skilled in the art. In one example, the satellites 120A-J can be dedicated navigation satellites that can enable users to locate their position by decoding signals received from the satellites 120A-J.

In one example, the satellites 120A-J can be radio frequency (RF) signal carriers. In one example, RF signal carriers can also be referred to as carriers of opportunity (COOPs) because these satellites provide RF signals whose measured carrier frequency and known location can be used for position determination of a ground receiver, as described in greater detail below.

In one aspect, the term "RF signal carrier" can refer to both GPS satellites and non-dedicated satellites.

The term "non-dedicated satellites" can refer to satellites, such as those not dedicated to GPS related navigational purpose applications (non-GPS satellites). The non-dedicated satellites can be owned or operated either domestically or by a foreign entity. Examples of non-dedicated satellites can include weather satellites, communication satellites, research satellites, or reconnaissance satellites operated by foreign nations. In another aspect, non-dedicated satellites can include navigation systems operated by foreign countries. Examples of such systems include, but are not limited to, Global Navigation Satellite System (GLONASS) operated by Russia, Galileo operated by the European Space Agency (ESA), Indian Regional Navigational Satellite System (IRNSS) operated by India, and Beidou-2 operated by China. Alternatively, the term "RF signal carrier" can refer to dedicated satellites operated domestically, such as GPS satellites.

LEO can generally be defined as an orbit within the locus extending from the Earth's surface 110 up to an altitude of approximately 2,000 kilometers (km). MEO can be a region of space around the Earth above the LEO (altitude of approximately 2,000 km or 1,243 miles (mi)) and below geostationary orbit (altitude of 35,786 km or 22,236 mi). The geostationary orbit, also known as the geostationary Earth orbit (GEO), can have a period approximately equal to the Earth's rotational period and an orbital eccentricity of approximately zero. The GPS satellites can be low Earth orbit (LEO), medium Earth orbit (MEO) satellites, or geostationary Earth orbit (GEO) satellites.

A GEO satellite can appear motionless (or slow-moving), at a fixed position in the sky, relative to ground observers. The GEO satellite can appear motionless to ground observers because the orbit of the GEO satellite is substantially similar to that of the Earth's rotational period. A GEO satellite can have a near 24 hour orbit, or an orbit near the rotational rate of the Earth, hence geostationary Earth orbit (GEO). In an example, a MEO satellite can have an orbital altitude of approximately 20,000 km with a near 12 hour orbit. The signal from a GPS satellite can be decoded to generate an estimate of range from the receiver to the transmitting GPS satellite.

The GPS signal can be a spread-spectrum, pseudo random noise (PRN) signal that encodes the location of the transmitting satellite. In an example, the GPS signals can use the L1, L2, or L5 frequency band. Each GPS signal can be used to solve for one unknown in the three dimensional (3D) position of the ground receiver (e.g., GPS receiver). The terms "ground receiver" and "ground station" may be used interchangeably herein. Since a 3D position can have three unknowns, three independent signals from three separate GPS satellites can be used to calculate a 3D position. Since the GPS satellite and the GPS receiver do not operate using a same clock, a fourth independent signal from a fourth GPS satellite can be used to compensate for clock bias in the GPS receiver. So, measurements from the independent GPS signals from four different GPS satellites can be used to calculate a precise GPS receiver position. Sometimes more than four satellites may be in view of a GPS receiver, so additional GPS signals can provide redundancy or additional error checking for the measurements used to calculate the GPS receiver position.

In one example, the position (e.g., in X, Y and Z dimensions) of the ground receiver can be determined using the measured Doppler shift from one or more non-dedicated satellites. The X dimension can refer to latitude, the Y dimension can refer to longitude, and the Z dimension can refer to an altitude. The Doppler shift can be a change in a frequency of a wave for an observer, such as a receiver, moving relative to the source of the wave, such as a transmitter on a satellite. The motion of the observer, the source, or both can generate a change of the frequency. When the source of the waves is moving toward the observer, each successive wave crest is emitted from a position closer to the observer than the previous wave. Therefore, each wave takes slightly less time to reach the observer than the previous wave. Thus, the time between the arrivals of successive wave crests at the observer is reduced, causing an increase in the perceived frequency. Conversely, if the source of waves is moving away from the observer, each wave is emitted from a position farther from the observer than the previous wave, so the arrival time between successive waves is increased, reducing the perceived frequency.

Objects moving at greater velocities relative to each other can provide larger size Doppler measurements than objects moving at slower velocities relative to each other.

A typical GPS receiver can determine its position when having a line-of-sight to at least four GPS satellites. In other words, the GPS receiver can determine its position when receiving at least four GPS signals from the four GPS satellites. However, there are areas where GPS is unavailable or degraded (e.g., mountain ranges, remote areas). In these situations, the GPS receiver is generally unable to determine its position.

As described herein, a ground receiver or ground station can use GPS signals and/or other types of RF signals in order to determine its position. The ground receiver can be stationary, moving, sailing or flying. As a result, users can be provided with an alternative for GPS capability. The ground receiver can receive RF signals transmitted from satellites. The receiver can know the original frequency of transmission of each RF signal carriers or COOPs (i.e., satellites orbiting the Earth) so it may compute the Doppler Shift and trend in Doppler shift. Using Doppler shift can avoid the decoding of signals or extracting information from radio signal internals. The Doppler shift can be measured with a single antenna. The ground receiver can use the Doppler shift and trend in Doppler shift to determine its position. In one example, the ground receiver can determine its position using at least four RF signals. In addition, the ground receiver can use a carrier frequency associated with the RF signal and knowledge of the ephemeris of the satellite transmitting the RF carrier when determining its position.

Figure 2:
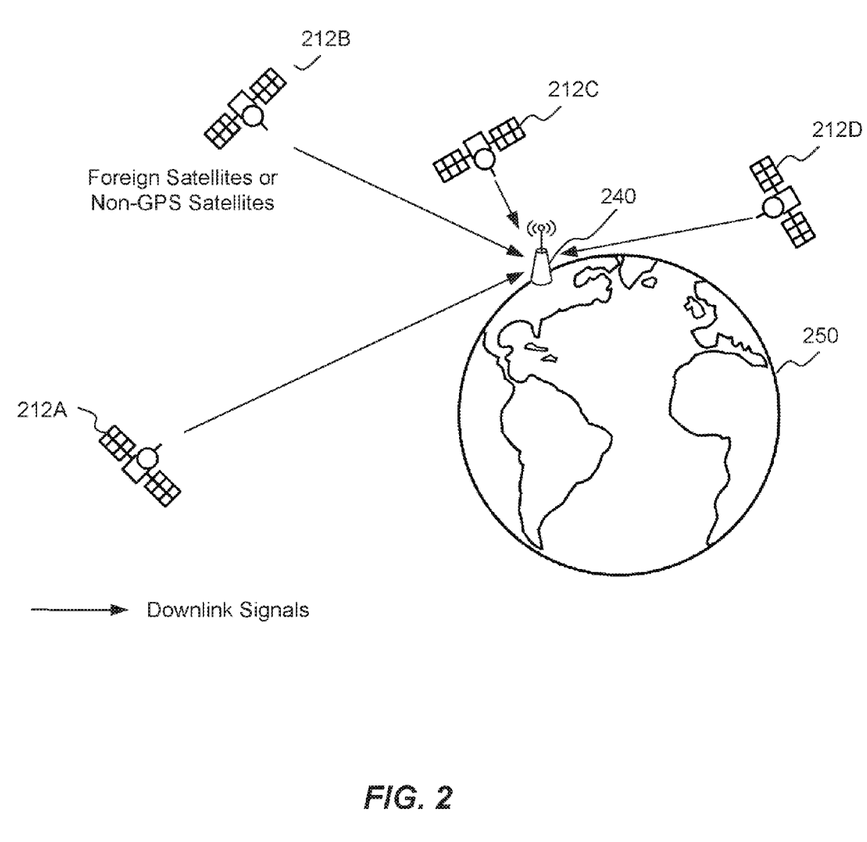
FIG. 2 illustrates a diagram of a ground receiver receiving a plurality of radio frequency (RF) signals from a plurality of RF signal carriers and determining a geographical location of the ground receiver based on a Doppler shift associated with each of the plurality of RF signals in accordance with an example.

FIG. 2 illustrates a diagram of a ground receiver 240 receiving a plurality of radio frequency (RF) signals from a plurality of RF signal carriers (COOPs) 212A-D and determining a geographical location of the ground receiver 240 using the plurality of RF signals. In general, a large number of satellites that are orbiting the Earth 250 transmit RF signals. Although many of these RF signals are not generally used for navigation purposes, the ground receiver 240 can utilize these RF signals for navigation purposes, in addition to or as an alternative to GPS signals that are intended for navigation purposes.

The RF signal carriers 212A-D can include satellites that are operated or owned by a foreign entity (e.g., navigation satellites operated or owned by a foreign country) or non-GPS satellites (e.g., weather satellites, communication satellites, research satellites, or reconnaissance satellites). Therefore, in one example configuration, the RF signals are not GPS signals or ranging signals. Rather, the RF signals can include RF signals intended for weather, communication, research, etc. In addition, the RF signals can be available from Ultra-high frequency (UHF) to Ka band at signal levels commensurate with low gain antennas. UHF designates a radio frequency range between 300 megahertz (MHz) and 3000 MHz (or 3 gigahertz (Ghz)). The Ka band covers the frequencies of 26.5-40 GHz.

The RF signal carriers 212A-D may be in LEO orbit, MEO orbit and/or GEO orbit. The RF signal carriers 212A-D in LEO orbit can include communication satellites, such as IRIDIUM, GLOBALSTAR and ORBCOMM. The RF signal carriers 212A-D in MEO orbit can include navigation satellites, such as Galileo and GLONASS. The RF signal carriers 212A-D in GEO orbit can include communication satellites, such as ultra-high frequency (UHF) Follow-On and mobile user objective system (MUOS). The RF signal carriers 212A-D can be referred to as "carriers of opportunity" because these satellites provide RF signals that enable the ground receiver 240 to determine its location.

The ground receiver 240 is a broadband receiver that can receive a plurality of RF signals from the RF signal carriers 212A-D. The ground receiver 240 can know source locations associated with the RF signal carriers 212A-D. The ground receiver 240 can identify a carrier frequency of a transmitter (i.e., the RF signal carriers 212A-D). In other words, the ground receiver 240 can identify a carrier frequency for each of the RF signals communicated from the RF signal carriers. The ground receiver 240 can identify a modulation format associated with the carrier frequency. In addition, the ground receiver 240 can identify or measure an orbit (e.g., ephemeris) of the RF signal carriers. The ground receiver 240 can previously identify the carrier frequency, modulation format, and ephemeris information based on an almanac or other external sources, or by measuring this. The ground receiver 240 can know the frequencies transmitted by the RF signal carriers 212A-D and the orbits of the RF signal carriers 212A-D. If the ground receiver 240 is directional, the ground receiver 240 can be pointed such that the RF signal is received. The RF signal (e.g., a GPS signal) can be measured, demodulated, decoded, and the information from the decoding is processed to obtain a pseudo-range. The information from the decoding can include a measured Doppler shift and an orbital location of each transmitter.

In one example, the ground receiver 240 generally does not know information conveyed in the RF signals other than the source location, carrier frequency and/or modulation format associated with the RF signals. Therefore, if the RF signals are conveying other types of information, such as weather information, the ground receiver 240 can ignore these other types of information because determination of the ground receiver's position generally does not require knowledge or use of such information.

In one example, the ground receiver 240 can know whether the RF signals have a spread-spectrum type modulation, and if so, the ground receiver 240 can identify a chip rate of the RF signals. The chip rate of a code is a number of pulses per second (i.e., chips per second) at which the code is transmitted or received.

The ground receiver 240 can measure a Doppler shift of each of the RF signals. In particular, the ground receiver 240 can measure a frequency of each RF signal that is not spread-spectrum received at the ground receiver 240 from the RF signal carriers 212A-D. The ground receiver 240 can compare the measured frequency to frequency values in the almanac. In other words, the almanac can include predetermined frequency values for each of the RF signals according to the ephemeris of the RF signal carriers 212A-D associated with the RF signals. The ground receiver 240 can calculate a difference in the measured frequency and the frequency values in the almanac in order to determine the Doppler shift of the RF signal.

If the RF signals received at the ground station 240 are spread-spectrum signals, the ground receiver 240 generally cannot measure the Doppler shift until the RF signals are despread. For example, the ground receiver 240 can perform codeless despreading or coded despreading with respect to the spread-spectrum RF signals before determining the Doppler shift.

The ground receiver 240 can measure the Doppler shift for at least four RF signals received from the RF signal carriers 212A-D. The ground receiver 240 can estimate its position (e.g., in X, Y and Z coordinates) using the Doppler shift for the at least four RF signals. In addition, the ground receiver 240 can determine an oscillator offset associated with the ground receiver 240. A local oscillator in the ground receiver 240 for performing RF measurements can drift. The ground receiver 240 can calculate the oscillator offset in order to estimate the drift of the local oscillator. Therefore, the ground receiver 240 can use the Doppler shift to estimate X, Y, Z and receiver oscillator offset. In one example, RF signals received from RF signal carriers 212A-D in LEO orbit can enable the ground receiver's position to be determined more rapidly as compared with using RF signals with less Doppler shifts or transmitted at greater distances (e.g., RF signals communicated from signal carriers 212A-D in GEO and HEO orbits).

In an alternative example, the ground receiver 240 can use techniques other than measuring the Doppler shift when determining its position. For example, the ground receiver 240 can use angle of arrival, time difference of arrival (TDOA) or frequency difference of arrival (FDOA) of the RF signals received from the RF signal carriers 212A-D and then use this information to determine the ground receiver's position. However, using angle of arrival, TDOA and FDOA can require two or more antennas, whereas using Doppler shift can require a single antenna.

Figure 3:
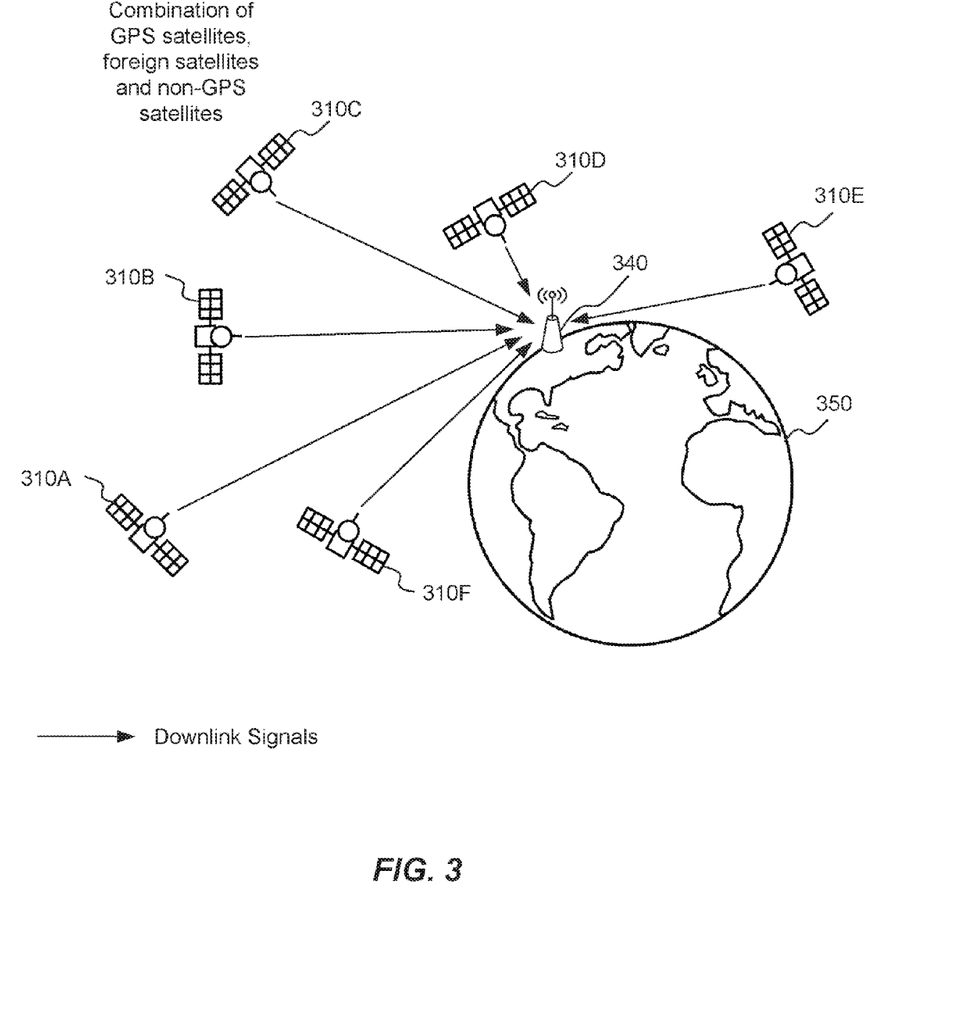
FIG. 3 illustrates a diagram of a ground receiver receiving a plurality of radio frequency (RF) signals and global positioning system (GPS) signals from a plurality of RF signal carriers and GPS satellites, respectively, and determining a geographical location of the ground receiver based on a Doppler shift associated with each of the plurality of RF signals and GPS signals in accordance with an example.

FIG. 3 illustrates a diagram of a ground receiver 340 receiving a plurality of radio frequency (RF) signals and global positioning system (GPS) signals from satellites 310A-F. The satellites 310A-F can include a plurality of RF signal carriers and GPS satellites. The RF signal carriers can include satellites that are operated by a foreign country (e.g., navigation satellites) or non-GPS satellites (e.g., weather satellites, communication satellites, research satellites, or reconnaissance satellites). Therefore, in one configuration, the signals communicated from the satellites 310A-F can include GPS signals and/or non-GPS signals (e.g., RF signals). The non-GPS signals can include non-ranging RF signals. In addition, the satellites 310A-F may be in LEO orbit, MEO orbit and/or GEO orbit.

In one example, the ground receiver 340 can receive a plurality of GPS signals from one or more GPS satellites. The ground receiver 340 can determine a geographical location of the ground receiver 310 using a Doppler shift associated with the plurality of GPS signals. In other words, the ground receiver 340 can determine its position in X, Y and Z coordinates (i.e., latitude, longitude and altitude) using the Doppler shift of the GPS signals. In addition, the ground receiver 340 can receive a plurality of RF signals from one or more RF signal carriers. The ground receiver 340 can measure the Doppler shift associated with each of the plurality of non-GPS RF signals. The ground receiver 340 can determine an orbit (i.e., ephemeris) for the plurality of RF signal carriers using the Doppler shift and Doppler trend associated with the RF signals and the geographical location of the ground receiver (as determined using the Doppler shift of the GPS signals). For example, prior to entering an area of GPS jamming, the ground receiver 340 can update the ephemeris for each RF signal carrier using the RF signals and the ground receiver's GPS-derived location as truth. When the GPS signals become unavailable or jamming is detected, the ground receiver 340 can continue to navigate itself using the RF signals from the RF signal carriers.

In one configuration, the ground receiver 340 can receive at least one GPS signal from a GPS satellite. In addition, the ground receiver 340 can receive at least one RF signal from an RF signal carrier. The ground receiver 340 can determine the geographical position of the ground receiver 340 using the at least one GPS signal and the at least one RF signal. In other words, the ground receiver 340 can use a combination of RF signals and GPS signals when, for example, less than four GPS signals and/or less than four RF signals are in line-of-sight with the ground receiver 340. As an example, the ground receiver 340 can use two GPS signals and two RF signals to determine its position.

In one example, the ground receiver 340 can receive at least four GPS signals from GPS satellites and determine its geographical location using a Doppler shift associated with the four GPS signals. In addition, the ground receiver 340 can receive at least four RF signals from RF signal carriers and determine its geographical location using a Doppler shift associated with the four RF signals. The ground receiver 340 can compare the geographical location determined using the GPS signals with the geographical location determined using the RF signals in order to verify that the ground receiver 340 is not receiving spoofed GPS signals from the GPS satellites. Therefore, the ground receiver 340 can monitor a signal strength of the GPS signals and switch to an RF-signal-only receiving mode if the signal strength changes or upon detecting other indications that the GPS signals could be jammed or spoofed.

Figure 4:
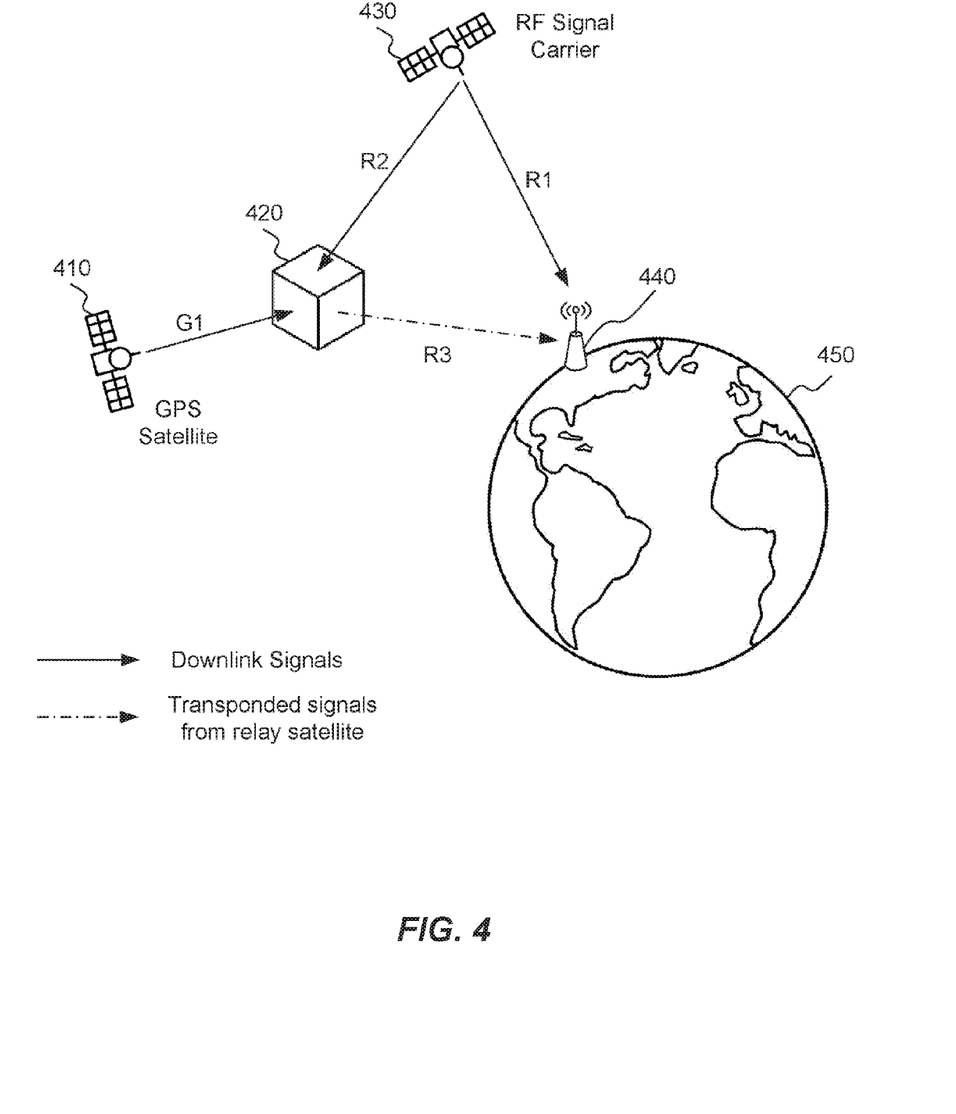
FIG. 4 illustrates a diagram of a ground receiver using radio frequency (RF) signals received directly from an RF signal carrier, transponded RF signals received from the RF signal carrier via a relay satellite, and transponded global positioning system (GPS) signals received from a GPS satellite via the relay satellite in order to determine a geographical location of the ground receiver in accordance with an example.

FIG. 4 illustrates a diagram of a ground receiver 440 using radio frequency (RF) signals received directly from an RF signal carrier 430, transponded RF signals received from the RF signal carrier 430 via a relay satellite 420, and transponded global positioning system (GPS) signals received from a GPS satellite 410 via the relay satellite 420 in order to determine a geographical location of the ground receiver 440.

The geographical location of the ground receiver 440 can be determined using a range from a transmitting satellite (e.g., the RF signal carrier 430) and the ground receiver 440. The determination of the range can be useful when the RF signal carrier 430 is a GEO satellite, as there is little or no Doppler shift available. In addition, the relay satellite 420 may be responsible for conversion of a Doppler signal to a ranging signal, which can be used to determine the geographical location. The speed of convergence using range information is faster for GEO and MEO satellites as compared to using Doppler shift only. In one example, ranges to a plurality of transmitting satellites can be determined.

The RF signal carrier 430 can include a satellite operated by a foreign entity or a non-GPS satellite. The ground receiver 440 can correlate each direct RF signal with each transponded RF signal in order to obtain a time lag of the transponded RF or transponded GPS signal with respect to the direct RF signal. The ground receiver 440 can determine a Doppler shift for each of the signals (e.g., direct RF signals, transponded RF signals, transponded GPS signals) received at the ground receiver 440. The ground receiver 440 can determine ranges to each of the GPS satellite 410, the relay satellite 420 and the RF signal carrier 430 using the RF signals, GPS signals and transponded RF signals. The ground receiver 440 can use that range information, time lag information and/or Doppler shift information to determine the ground receiver's location.

In one example, the RF signal carrier 430 and the GPS satellite 410 can be GEO satellites. In general, GEO satellites are the most commonly found space-based transmitters. However, RF signals from GEO satellites have the smallest Doppler shift of any satellites (e.g., LEO or MEO satellites) when received at a terrestrial receiver (i.e., the ground receiver 440). The Doppler shift can be approximately zero when the ground receiver 440 is at rest. A higher Doppler shift can enable the ground receiver 440 to determine its position more rapidly as compared with a lower Doppler shift. In one example, the RF signals are not GPS signals or ranging signals.

In order to increase the Doppler shift of RF signals communicated by the RF signal carrier 430, the relay satellite 420 can transpond the RF signal communicated from the RF signal carrier 430, thereby increasing the Doppler shift. By transponding the RF signal (i.e., shifting a frequency associated with the RF signal), the relay satellite 420 can simultaneously impart a larger Doppler shift to the RF signal. As a result, the larger Doppler shift can result in the ground receiver 440 being able to more rapidly determine its location. In one example, the ground receiver 440 does not know specific types of information (e.g., weather information) conveyed in the RF signal from the RF signal carrier 430 other than a carrier frequency of the RF signal and an ephemeris of the relay satellite 420 augmenting the Doppler shift in the RF signal.

In one configuration, the relay satellite 420 can be a cube satellite (CUBESAT), pico-satellite, nano-satellite, microsatellite, or other similar types of small and/or inexpensive satellites. The CUBESAT can be a type of miniaturized satellite that can have a volume of approximately a liter (10 centimeter (cm) cube) with a weight less than 2 kilograms (kg). The CUBESAT can use commercial off-the-shelf electronics components. The picosatellite (or picosat) can refer to an artificial satellite with a wet mass between 0.1 and 1 kg (0.22 and 2.2 lb). The nanosatellite (or nanosat) can refer to an artificial satellite with a wet mass between 1 and 10 kilograms (kg) (2.2 and 22 pounds (lb)). A microsatellite (or microsat) can refer to an artificial satellite with a wet mass between 10 and 100 kg (22 and 220 lb).

The relay satellite 420 can include various components capable of providing various functions, such a power source or a power generation mechanism, a mechanism to control heating and cooling of the relay satellite 420, and/or a mechanism to point a transmitter or antenna to the Earth. The power generation mechanism can include solar cells or panels. The power source can include a battery or capacitive device. The mechanism to control the heating and cooling of the relay satellite 420 may control the heating and cooling of the relay satellite 420 passively, so the mechanism does not require a power source to function properly. The mechanism to point the transmitter or antenna to the Earth may steer or rotate the position of the relay satellite 420 passively.

In one example, the ground receiver 440 can receive a first RF signal directly from the RF signal carrier 430. The RF signal carrier 430 can communicate a second RF signal to the relay satellite 420. The relay satellite 420 can receive the second RF signal, shift a frequency associated with the second RF signal to create a third RF signal (i.e., a transponded RF signal), and send the third RF signal to the ground receiver 440. In addition, the third RF signal can be amplified with respect to the second RF signal. As an example, the relay satellite 420 can shift the frequency of the second RF signal in order to increase the Doppler shift associated with the second RF signal. The ground receiver 400 can possess information on the position and ephemeris of the GPS satellite 410, relay satellite 420 and RF signal carrier 430. In other words, the ground receiver 440 can know the orbit for each of the GPS satellite 410, relay satellite 420 and RF signal carrier 430.

In addition, the relay satellite 420 can receive a GPS signal from the GPS satellite 410, shift a frequency of the GPS signal to create the third RF signal (i.e., a transponded RF signal), and send the third RF signal to the ground receiver 440. In addition, the third RF signal can be amplified with respect to the second RF signal. As an example, the relay satellite 420 can shift the frequency of the GPS signal in order to increase the Doppler shift associated with the GPS signal.

Therefore, the ground receiver 440 can receive a transponded RF signal from the RF signal carrier 430 (e.g., the third RF signal) via the relay satellite 420 and/or receive the transponded RF signal from the GPS satellite 410 (e.g., the third RF signal) via the relay satellite 420. In addition, the ground receiver 440 can have a line of sight to 12 or more GPS satellites. The relay satellite 420 can transpond GPS signals from one or more GPS satellites in addition to transponding the RF signals from the RF signal carriers.

The ground receiver 440 can calculate a first range (R1) that represents a distance traveled by the first RF signal between the RF signal carrier 430 and the ground receiver 440. The ground receiver 440 can calculate a third range (R3) that represents a distance traveled by the third RF signal between the relay satellite 420 and the ground receiver 440. A second range (R2) can represent a distance between the RF signal carrier 430 and the relay satellite 420. A GPS range (G1) can represent a distance traveled by the GPS signal between the GPS satellite 410 and the relay satellite 420. The ground receiver 440 can use the first range (R1), the second range (R2), the third range (R3) and the GPS range (G1) to determine the geographical location of the ground receiver 440.

In one example, the ground receiver 440 can measure a time of flight (T) for the GPS signal to arrive at the ground receiver 440 from the GPS satellite 410 by decoding or despreading the third RF signal to determine a GPS ephemeris and GPS time. In other words, T can represent the amount of time for the GPS signal to be communicated from the GPS satellite 410, transponded at the relay satellite 420, and then received at the ground station 440. The ground receiver 440 can correlate GPS chips to find the time of flight (T) from the GPS satellite 410 to the ground receiver 440.

The ground receiver 440 can calculate an estimate of R3 using $$T = \frac{G1 + R3}{c} + d,$$

wherein c is the speed of light and G1 is predetermined (e.g., using an almanac and it can be looked up by decoding the transponded GPS signal). In addition, d is a measured time delay representing an amount of time for the relay satellite 420 to receive the GPS signal from the GPS satellite 410 or receive the second RF signal from the RF signal carrier 430, shift a frequency associated with the GPS signal or the second RF signal to create the third RF signal, and send the third RF signal to the ground receiver 440. In other words, the ground receiver 440 can calculate the time of flight (T) and then subtract a known time of propagation from the GPS satellite 410 to the ground receiver 440

$$\left(\text{i.e., } \frac{G1 + R3}{c}\right)$$

and transponder delay (d). An estimated range from the relay satellite 420 to the ground receiver 440 (i.e., R3) can be slightly in error if a receiver clock differs from the GPS time. After two or more measurements at different orbital positions of the relay satellite 420, the ground receiver 440 can solve receiver clock bias and compute an absolute range from the relay satellite 420 to the ground receiver 440.

The ground receiver 440 can calculate R1 using $$\frac{R1}{c} + \tau = \frac{R3 + R2}{c} + d,$$

wherein t represents a time lag between the ground receiver 440 receiving the third RF signal from the relay satellite 420 with respect to receiving the first RF signal from the RF signal carrier 430, wherein R2 is predetermined (e.g., using an almanac). Therefore, the ground receiver 440 can calculate R1 and R3. The ground receiver 440 can previously identify G1 and R2. The ground receiver 440 can use R1, R2, R3 and G1 when determining its geographical position. In one example, at least four total measured Doppler or computing range (R3) signals are used to find X, Y and Z coordinates of the ground receiver 440, as well as the oscillator offset.

In one configuration, the ground receiver 440 can calculate a first Doppler shift associated with the first RF signal (i.e., a direct source signal) received at the ground receiver 440 from the RF signal carrier 430. The ground receiver 440 can calculate a second Doppler shift associated with the third RF signal received at the ground receiver 440 from the relay satellite 420 (i.e., a transponded source signal), wherein the third RF signal has an increased Doppler shift with respect to the second RF signal and the GPS signal. The ground receiver 440 can determine its geographical location using the first Doppler shift, the second Doppler shift, the first range (R1), the second range (R2), the third range (R3) and the GPS range (G1).

Figure 5:
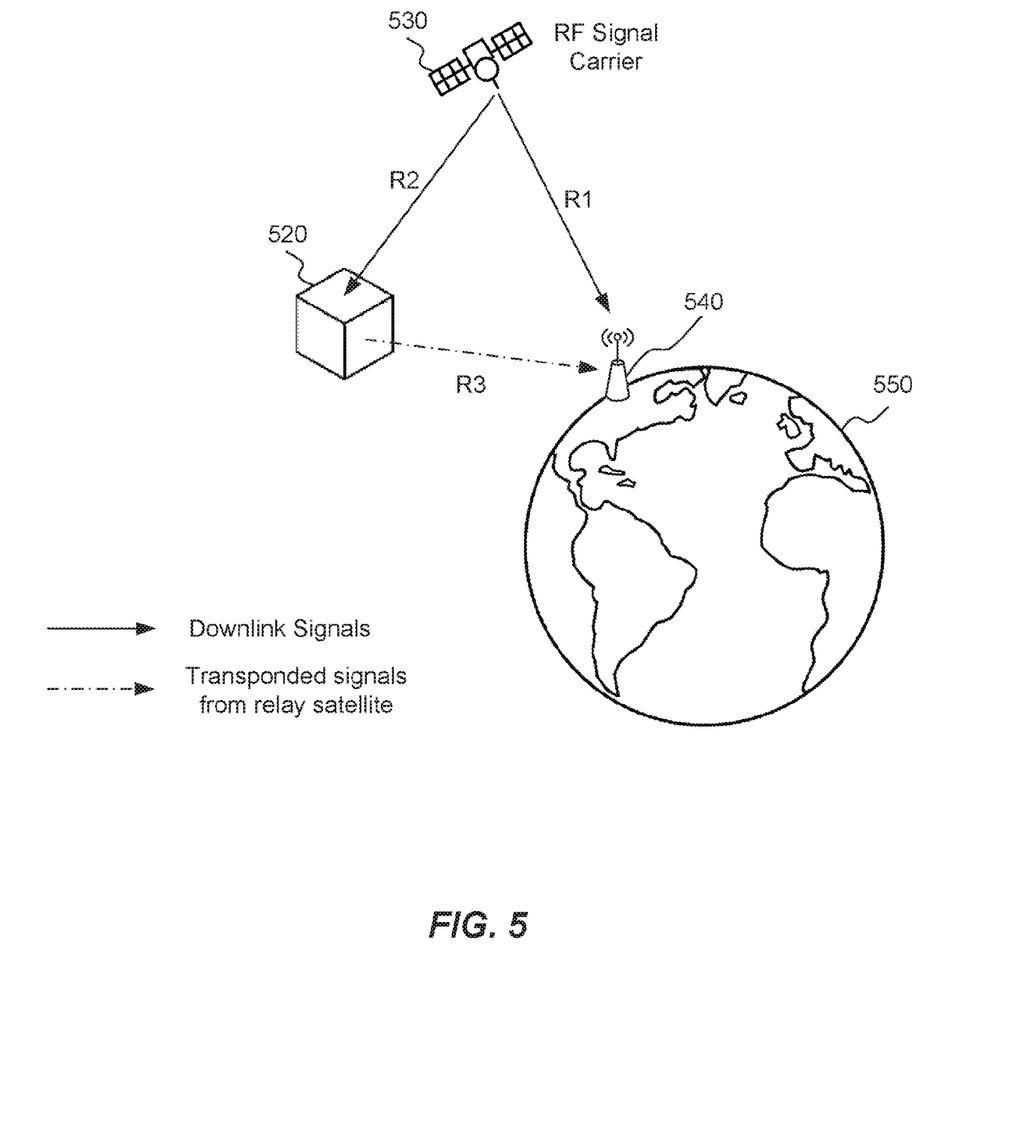
FIG. 5 illustrates a diagram of a ground receiver using radio frequency (RF) signals received directly from an RF signal carrier and transponded RF signals received from the RF signal carrier via a relay satellite in order to determine a geographical location of the ground receiver in accordance with an example.

FIG. 5 illustrates a diagram of a ground receiver 540 receiving radio frequency (RF) signals directly from an RF signal carrier 530 and transponded RF signals from the RF signal carrier 530 via a relay satellite 520 in order to determine a geographical location of the ground receiver 540. The RF signals can be non-GPS signals (e.g., RF signals intended for weather, communication, or research). In other words, the non-GPS signals can be non-ranging RF signals. The RF signal carrier 530 can include a satellite operated by a foreign entity or a non-GPS satellite. In one example, the RF signal carrier 530 can be a GEO satellite. Alternatively, the RF signal carrier 530 can be a LEO satellite or MEO satellite. In addition, the relay satellite 520 can be a cube satellite (CUBESAT), pico-satellite, nano-satellite, micro-satellite, or other similar types of small and/or inexpensive satellites.

The ground receiver 540 can receive a first RF signal from the RF signal carrier 530. The ground receiver 540 can receive a third RF signal from the relay satellite 520, wherein the third RF signal is a transponded RF signal. In other words, the relay satellite 520 can receive a second RF signal from the RF signal carrier 530 and shift a frequency of the second RF signal to create the third RF signal. In one example, the relay satellite 520 may shift the frequency in order to increase a Doppler shift associated with the second RF signal when, for example, the RF signal carrier 530 is a GEO satellite.

In one example, a first range (R1) can represent a distance traveled by the first RF signal between the RF signal carrier 530 and the ground receiver 540. A second range (R2) can represent a distance between the RF signal carrier 530 and the relay satellite 520. A third range (R3) can represent a distance traveled by the third RF signal between the relay satellite 520 and the ground receiver 540.

The ground receiver 540 can determine its geographical location using the first range (R1), the second range (R2), and the third range (R3). In particular, the ground receiver 540 can determine its geographical location using $$\frac{R1}{c} + \tau = \frac{R3 + R2}{c} + d,$$

wherein c is a speed of light and R2 is predetermined (e.g., using an almanac). In addition, d is a measured time delay representing an amount of time for the relay satellite 520 to receive the second RF signal from the RF signal carrier 530, shift a frequency associated with the second RF signal to create the third RF signal, and send the third RF signal to the ground receiver 540. Furthermore, t represents a time lag between the ground receiver 540 receiving the third RF signal from the relay satellite 520 with respect to receiving the first RF signal from the RF signal carrier 530. In one example, R1-R3 is a constant and R3 is conditional on R1.

Figure 6:
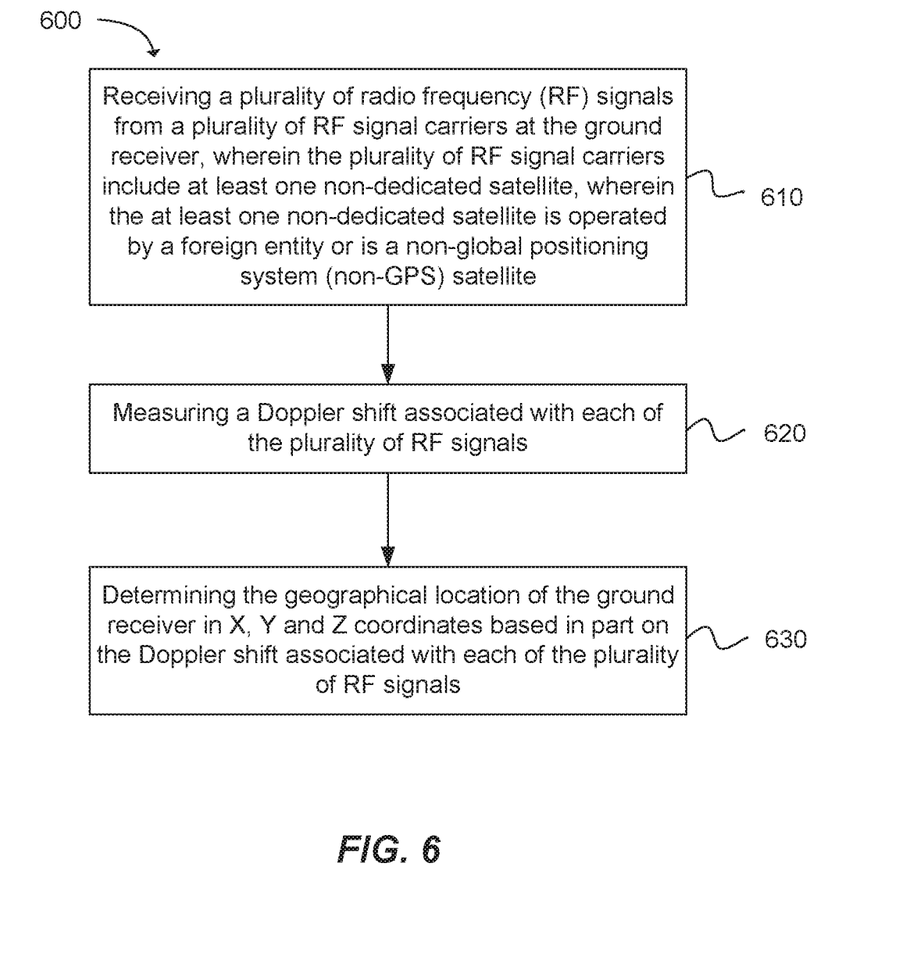
FIG. 6 depicts a flow chart of a method for determining a geographical location of a ground receiver in accordance with an example.

FIG. 6 depicts a flow chart of a method 600 for determining a geographical location of a ground receiver. A plurality of radio frequency (RF) signals can be received from a plurality of RF signal carriers at the ground receiver, wherein the plurality of RF signal carriers include at least one non-dedicated satellite, wherein the at least one non-dedicated satellite is operated by a foreign entity or is a non-global positioning system (non-GPS) satellite, as in block 610. A Doppler shift associated with each of the plurality of RF signals at the ground receiver can be measured, as in block 620. The geographical location of the ground receiver can be determined in X, Y and Z coordinates based in part on the Doppler shift associated with each of the plurality of RF signals, as in block 630.

Figure 7:
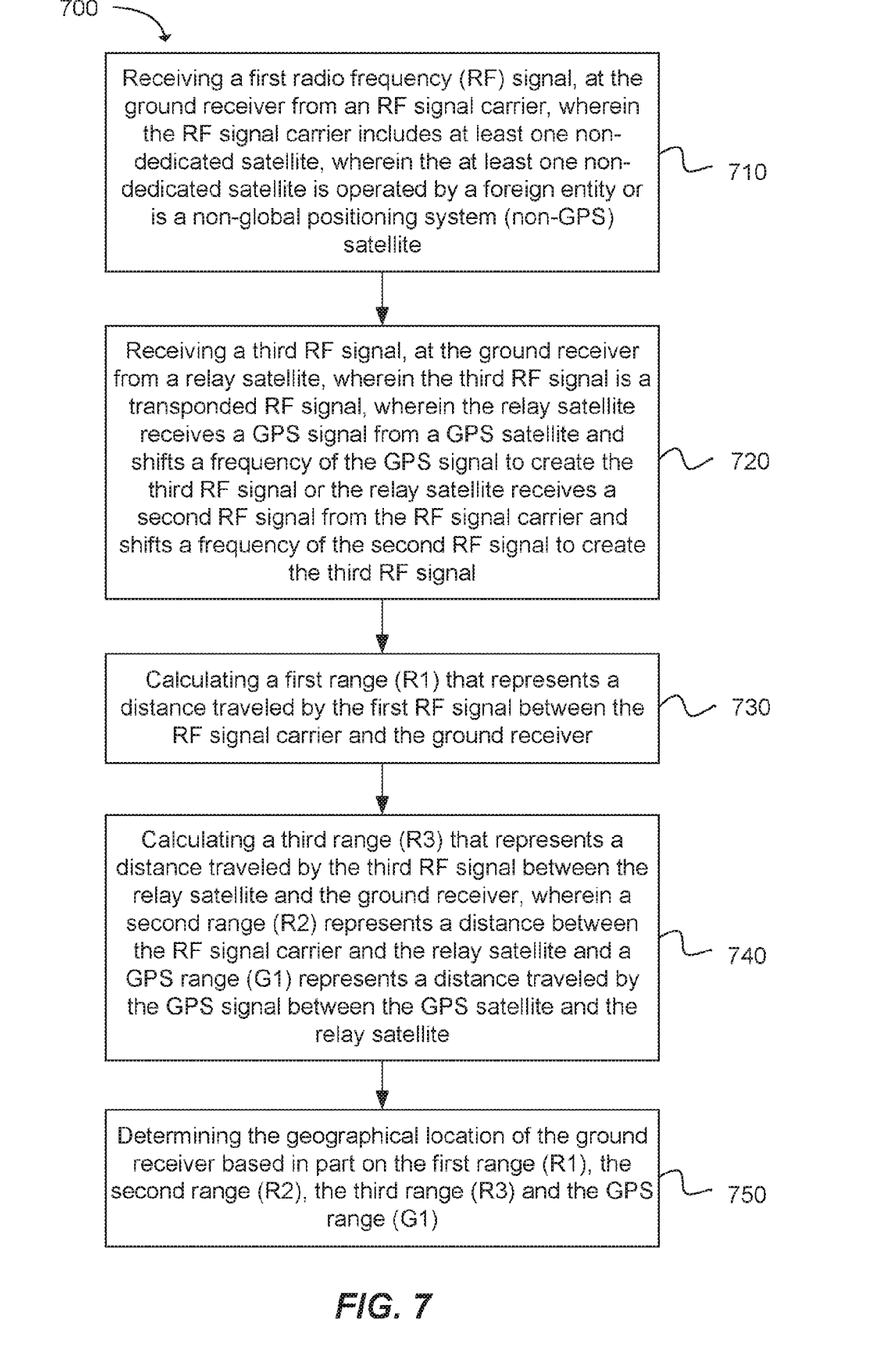
FIG. 7 depicts a flow chart of an additional method for determining a geographical location of a ground receiver in accordance with an example.

FIG. 7 depicts a flow chart 700 of an additional method for determining a geographical location of a ground receiver. A first radio frequency (RF) signal can be received, at the ground receiver from an RF signal carrier, wherein the RF signal carrier includes at least one non-dedicated satellite, wherein the at least one non-dedicated satellite is operated by a foreign entity or is a non-global positioning system (non-GPS) satellite, as in block 710. A third RF signal can be received, at the ground receiver from a relay satellite, wherein the third RF signal is a transponded RF signal, wherein the relay satellite receives a GPS signal from a GPS satellite and shifts a frequency of the GPS signal to create the third RF signal or the relay satellite receives a second RF signal from the RF signal carrier and shifts a frequency of the second RF signal to create the third RF signal, as in block 720. A first range (R1) can be calculated that represents a distance traveled by the first RF signal between the RF signal carrier and the ground receiver, as in block 730. A third range (R3) can be calculated that represents a distance traveled by the third RF signal between the relay satellite and the ground receiver, wherein a second range (R2) represents a distance between the RF signal carrier and the relay satellite and a GPS range (G1) represents a distance traveled by the GPS signal between the GPS satellite and the relay satellite, as in block 740. The geographical location of the ground receiver can be determined based in part on the first range (R1), the second range (R2), the third range (R3) and the GPS range (G1), as in block 750.

Figure 8:
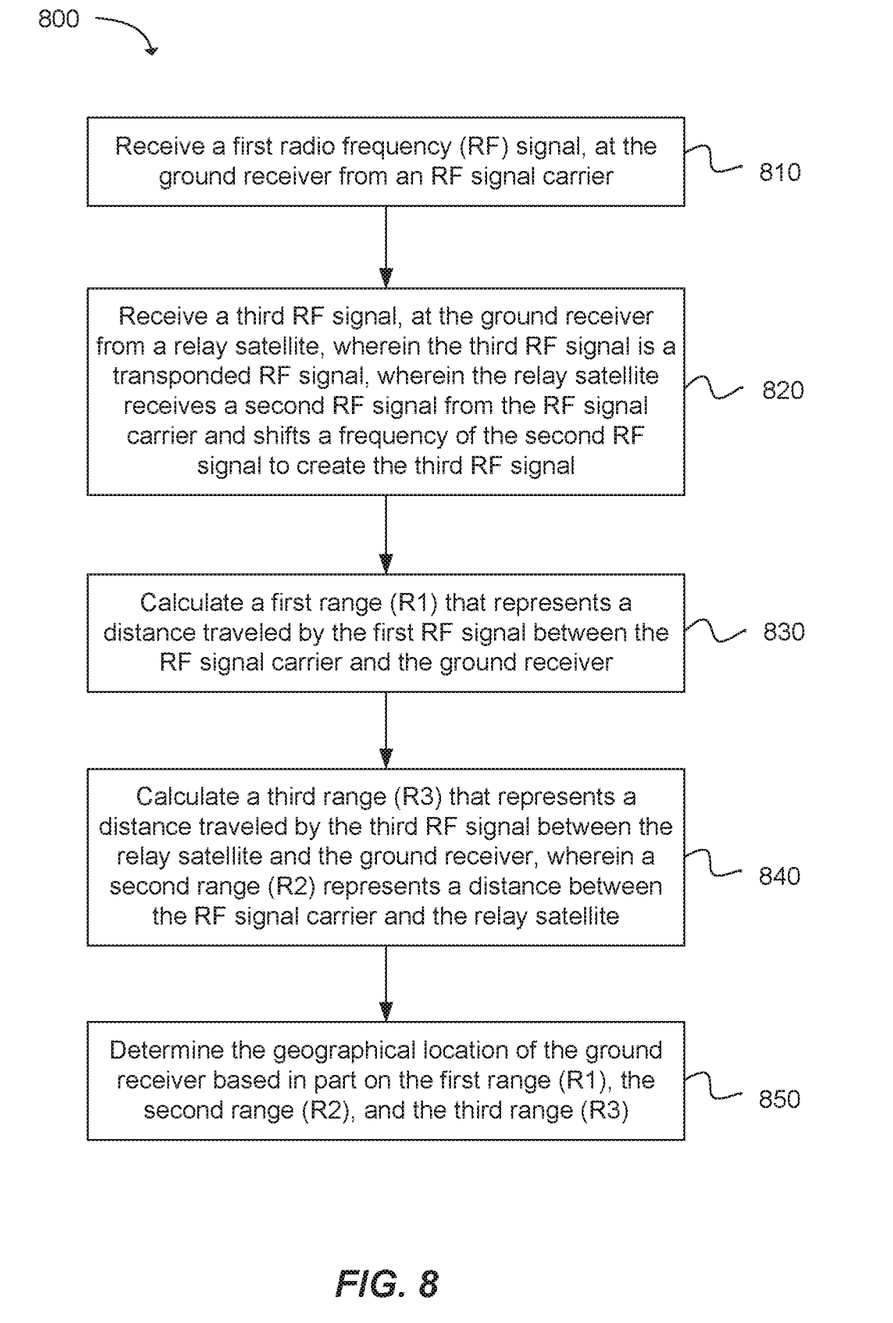
FIG. 8 depicts functionality of computer circuitry of a ground receiver operable to determine a geographical location of the ground receiver in accordance with an example.

FIG. 8 depicts functionality of computer circuitry of a ground receiver 800 operable to determine a geographical location of the ground receiver. The computer circuitry can be configured to receive a first radio frequency (RF) signal, at the ground receiver from an RF signal carrier, as in block 810. The computer circuitry can be configured to receive a third RF signal, at the ground receiver from a relay satellite, wherein the third RF signal is a transponded RF signal, wherein the relay satellite receives a second RF signal from the RF signal carrier and shifts a frequency of the second RF signal to create the third RF signal, as in block 820. The computer circuitry can be further configured to calculate a first range (R1) that represents a distance traveled by the first RF signal between the RF signal carrier and the ground receiver, as in block 830. In addition, the computer circuitry can be configured to calculate a third range (R3) that represents a distance traveled by the third RF signal between the relay satellite and the ground receiver, wherein a second range (R2) represents a distance between the RF signal carrier and the relay satellite, as in block 840. Furthermore, the computer circuitry can be configured to determine the geographical location of the ground receiver based in part on the first range (R1), the second range (R2), and the third range (R3), as in block 850.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention.

One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for determining a geographical location of a ground receiver, the method comprising:
receiving a first radio frequency (RF) signal, at the ground receiver from an RF signal carrier;
receiving a second RF signal, at the ground receiver from a relay satellite, wherein the second RF signal is a transponded RF signal, wherein the relay satellite receives a GPS signal from a GPS satellite and shifts a frequency of the GPS signal to create the second RF signal or the relay satellite receives a RF signal from the RF signal carrier and shifts a frequency of the second RF signal to create the second RF signal;
calculating a first range (R1) that represents a distance traveled by the first RF signal between the RF signal carrier and the ground receiver;
calculating a third range (R3) that represents a distance traveled by the second RF signal between the relay satellite and the ground receiver, wherein a second range (R2) represents a distance between the RF signal carrier and the relay satellite and a GPS range (G1) represents a distance traveled by the GPS signal between the GPS satellite and the relay satellite; and
determining the geographical location of the ground receiver based in part on the first range (R1), the second range (R2), the third range (R3) and the GPS range (G1).

2. The method of claim 1, further comprising:
calculating a first Doppler shift associated with the first RF signal received at the ground receiver from the RF signal carrier;
calculating a second Doppler shift associated with the second RF signal received at the ground receiver from the relay satellite, wherein the second RF signal has an increased Doppler shift with respect to the RF signal and the GPS signal; and
determining the geographical location of the ground receiver based in part on the first Doppler shift, the second Doppler shift, the first range (R1), the second range (R2), the third range (R3) and the GPS range (G1).

3. The method of claim 1, further comprising:
measuring a time of flight (T) for the GPS signal to arrive at the ground receiver from the GPS satellite by decoding the second RF signal to determine a GPS ephemeris and GPS time; and
calculating an estimate of R3 using $T=(G1+R3)/c+d$,
wherein c is the speed of light,
wherein G1 is predetermined, and
wherein d is a measured time delay representing an amount of time for the relay satellite to receive the GPS signal from the GPS satellite or receive the RF signal from the RF signal carrier, shift a frequency associated with the GPS signal or the RF signal to create the second RF signal, and send the second RF signal to the ground receiver.

4. The method of claim 3, further comprising calculating R1 using (R2+R3)/c+d=(R1/c)+t, wherein t represents a time lag between the ground receiver receiving the second RF signal from the relay satellite with respect to receiving the first RF signal from the RF signal carrier, wherein R2 is predetermined.

5. The method of claim 1, further comprising:
receiving a plurality of global position system (GPS) signals from one or more GPS satellites;
determining the geographical location of the ground receiver based in part on the plurality of GPS signals; and
determining an orbit for each of a plurality of RF signal carriers using the geographical location of the ground receiver.

6. The method of claim 1, wherein the geographical position and ephemeris for each of the GPS satellite, RF signal carrier and relay satellite is known to the ground receiver.

7. The method of claim 1, wherein the RF signal carrier includes at least one of low Earth orbit (LEO) satellites, medium Earth orbit (MEO) satellites or geostationary (GEO) satellites.

8. The method of claim 1, wherein the RF signal carrier comprises a GPS satellite.

9. The method of claim 1, wherein the RF signal carrier comprises a non-dedicated satellite.

10. The method of claim 1, wherein the RF signals are not global positioning system (GPS) signals or ranging signals.

11. The method of claim 1, wherein the relay satellite is selected from a group consisting of a cube satellite (CUBESAT), a picosatellite, a nanosatellite, and a microsatellite, wherein the CUBESAT weighs less than 5 kilograms.

12. A ground receiver operable to determine a geographical location of the ground receiver; the ground receiver having computer circuitry configured to:
receive a first radio frequency (RF) signal, at the ground receiver from an RF signal carrier;
receive a third RF signal, at the ground receiver from a relay satellite, wherein the third RF signal is a transponded RF signal, wherein the relay satellite receives a second RF signal from the RF signal carrier and shifts a frequency of the second RF signal to create the third RF signal;
calculate a first range (R1) that represents a distance traveled by the first RF signal between the RF signal carrier and the ground receiver,
calculate a third range (R3) that represents a distance traveled by the third RF signal between the relay satellite and the ground receiver, wherein a second range (R2) represents a distance between the RF signal carrier and the relay satellite; and
determine the geographical location of the ground receiver based in part on the first range (R1), the second range (R2), and the third range (R3).

13. The ground receiver of claim 12, further configured to determine the geographical location of the ground receiver using (R2+R3)/c+d=(R1/c)+t,
wherein c is a speed of light,
wherein R2 is predetermined,
wherein d is a measured time delay representing an amount of time for the relay satellite to receive the second RF signal from the RF signal carrier, shift a frequency associated with the second RF signal to create the third RF signal, and send the third RF signal to the ground receiver, and
t represents a time lag between the ground receiver receiving the third RF signal from the relay satellite with respect to receiving the first RF signal from the RF signal carrier.

14. The ground receiver of claim 12, wherein R1 minus R3 is a constant and R3 is conditional on R1.

15. The ground receiver of claim 12, wherein the first RF signal and the second RF signal are not global positioning system (GPS) signals.

16. The ground receiver of claim 12, wherein the RF signal carrier includes at least one non-dedicated satellite that is operated by a foreign entity or is a non-global positioning system (non-GPS) satellite.

* * * * *